Patented May 27, 1952

2,598,640

UNITED STATES PATENT OFFICE 2,598,640

PROCESS FOR PRODUCING β-(ALKYL MERCAPTO) ETHYL CHLORIDE

John K. Fincke, Dayton, Ohio, assignor to Monsanto Chemical Company, St. Louis, Mo., a corporation of Delaware No Drawing. Application February 24, 1948, Serial No. 10,587

2 Claims. (Cl. 260—609)

This invention provides an improved process for producing β-(alkyl mercapto) ethyl chlorides.

An object of this invention is to provide an improved process for producing β-(alkyl mercapto) ethyl chlorides by the reaction of the corresponding alcohol and hydrogen chloride.

I have found that by treating a β-(alkyl mercapto) ethanol, wherein the alkyl group contains at least 6 carbon atoms, with hydrogen chloride, a good yield of the corresponding chloride may be obtained.

In prior processes in which alcohols or ethers are treated with hydrogen chloride in order to form the corresponding chlorides, it has been the practice to conduct a reaction in the presence of metal halides which absorb the water formed in the reaction. In accordance with the present invention I have found that β-(alkyl mercapto) ethanols, wherein the alkyl group contains from 6 to 18 carbon atoms, may be treated with HCl and the corresponding chlorides obtained in good yields and without the employment of metal chloride catalysts as dehydrating agents.

According to the present invention the treatment of mercapto ethanols is carried out upon the alkyl mercapto ethanol in the liquid phase and at a temperature above the melting point of the alcohol but below 100° C. The HCl is preferably employed in the gaseous anhydrous form, although liquid anhydrous HCl may also be employed by a proper arrangement of the apparatus and the operating conditions. The alkyl group in the β-(alkyl mercapto) ethanol may be any aliphatic group of normal, branched or cyclic configuration.

The following examples will illustrate the practice of my invention:

Example 1

β-(n-Octyl mercapto) ethyl chloride.—50 grams (0.262 mole) of β-(n-octyl mercapto) ethanol was charged to a 500 cc. flask provided with a gas inlet tube, a stirrer, a reflux condenser and a thermometer. Anhydrous HCl gas was passed into the β-(n-octyl mercapto) ethanol at room temperature. The reaction heat caused the temperature to rise to 84° C. Shortly after the maximum temperature rise occurred, unabsorbed HCl appeared in the exit tube, indicating the reaction to be nearly completed.

Three layers separated out upon standing. A top layer constituting a large proportion of the reaction mass, a small dark middle layer and a clear bottom layer (probably HCl and $H_2O$) was visible. The addition of HCl was again commenced and continued for another hour at a temperature of 50° C. to 60° C., maintained by the application of heat. At the end of this time the small, dark, middle layer product had almost disappeared. The entire product was dissolved in ethyl ether, washed with water, then with dilute potassium carbonate, dried and distilled. Yield: 89.0%, $n_D^{25}$=1.4741. Boiling range 117–119.5° C./4 mm. pressure. Analysis: per cent S found=15.87%; theory=15.3.

Example 2

β-(n-Decyl mercapto) ethyl chloride.—236 grams of crude β-(n-decyl mercapto) ethanol prepared by the addition of β-mercapto ethanol to n-decene was charged to a 3-necked, 500 cc. flask fitted with a gas inlet tube, mechanical stirrer, thermometer and reflux condenser. A flow of anhydrous HCl gas was started, whereupon the temperature of the reacting mass rose to 60° C. within a few minutes. The flask was cooled by means of a water bath sufficiently so as to keep the temperature of the reaction below 65° C. After approximately 1½ hours the temperature had dropped to 33° C., and the reaction was considered complete. The flask contents were transferred to a separatory funnel and the HCl—$H_2O$ layer separated. The material was then distilled and the product distilling over a boiling range of 118–121° C./1 mm. mercury pressure was recovered. Yield: 81% of theory. Color, water white. $n_D^{25}$=1.4750.

Example 3

β-(n-Dodecyl mercapto) ethyl chloride.—150 grams β-(n-dodecyl mercapto) ethanol was charged to a 500 cc. flask provided with a thermometer, a water cooled condenser, propeller stirrer and an HCl inlet tube. A flow of anhydrous HCl gas was led into the material, the temperature rising rapidly to 80° C., at which point the flask was cooled to prevent further temperature rise. After approximately 45 minutes the temperature had fallen to 50° C. to 55° C. At this point HCl gas could be detected at the exit of the condenser. The addition of HCl gas was continued for one additional hour, the temperature being maintained at 40° C. to 50° C. The flask contents were then removed, dissolved in ether and the water layer separated from the resulting emulsion as completely as possible. The remaining ether and water was removed by evaporation. The dry residue was distilled over a boiling range of 152–153° C./1.0–

1.5 mm. The product weighed 96 grams. $n_D^{25}=1.4740$.

Example 4

β-(Tertiary-octyl mercapto) ethyl chloride.—254.8 g. of β-(tertiary octyl mercapto) ethanol was placed in the reaction flask, described in Example 2 above, and anhydrous HCl gas passed in. The temperature was kept below 60° C. by means of a water bath. At the end of 40 minutes the reaction appeared to be complete, the material was transferred to a separatory funnel and the lower layer drawn off. The product was dried under a vacuum and distilled. The product boiling over a range of 73-78° C./1 mm. was collected. $n_D^{25}=1.4869$. Yield=68%.

Example 5

β-(Tertiary tetradecyl mercapto) ethyl chloride.—200 grams of β-(tertiary tetradecyl mercapto) ethanol having a boiling range of 140-142° C./1.4 mm. was charged to the reaction flask employed in Example 2 above. Anhydrous HCl was added, whereupon the temperature rose rapidly to 70° C. Cooling water was applied to the flask to keep the temperature below 70° C. After approximately one hour the temperature had dropped to 40° C. and the reaction was considered complete. The reaction mixture was prepared and the lower layer drawn off, dried and distilled. The product boiling over a range of 121-124° C./1 mm. pressure and corresponding to a yield of 65.0% was collected.

Example 6

β-(n-Octadecyl mercapto) ethyl chloride.—100 grams of β-(n-octadecyl mercapto) ethanol was charged to the flask described in Example 2 above, and a stream of anhydrous HCl gas passed in. During the addition of the gas no sharp temperature rise was noted; however, water was evolved during the reaction. The flask was warmed to 80° C. to 100° C. until the crystallizing point of the contents dropped to about 30° C., which was approximately three hours. Water was withdrawn under a vacuum. The material remaining in the flask had a crystallizing point of 35° C. The flask was again warmed to 80° C. for one hour and HCl passed into it. No further evolution of water was observed. The product was again dried at 85° C. under 1 mm. pressure. The crystallizing point was 35° C. Yield=104.6 grams. Approximately 100% of theory was obtained.

What I claim is:

1. The process for producing a β-(alkyl mercapto) ethyl chloride which consists in treating a β-(alkyl mercapto) ethanol wherein the alkyl group has from 6 to 18 carbon atoms, with anhydrous hydrogen chloride at a temperature above the melting point of the said β-(alkyl mercapto) ethanol, but below 100° C.

2. The process for producing β-(octyl mercapto) ethyl chloride which consists in treating β-(octyl mercapto) ethanol with anhydrous hydrogen chloride at a temperature above the melting point of the said β-(octyl mercapto) ethanol, but below 100° C.

JOHN K. FINCKE.

REFERENCES CITED

The following references are of record in the file of this patent:

UNITED STATES PATENTS

| Number | Name | Date |
|---|---|---|
| 1,918,371 | Berndt et al. | July 18, 1933 |
| 2,007,322 | Aickelin | July 9, 1935 |
| 2,086,585 | Taub et al. | July 13, 1937 |
| 2,411,275 | Kinneberg et al. | Nov. 19, 1946 |

OTHER REFERENCES

Bennett: J. C. S. (London), vol. 121, page 2145 (1922).

Richter's Organic Chemistry, vol. 1, page 247, Elswier Pub. Co., Nordeman Pub. Co., N. Y. (1944).